United States Patent
Jung

(10) Patent No.: US 10,667,659 B2
(45) Date of Patent: Jun. 2, 2020

(54) ROBOT CLEANER, METHOD OF OPERATING THE SAME, AND AUGMENTED REALITY SYSTEM

(71) Applicant: LG ELECTRONICS INC., Seoul (KR)

(72) Inventor: Jaeduck Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 15/689,139

(22) Filed: Aug. 29, 2017

(65) Prior Publication Data
US 2018/0055312 A1    Mar. 1, 2018

(30) Foreign Application Priority Data
Aug. 30, 2016   (KR) .................. 10-2016-0111081

(51) Int. Cl.
| | | |
|---|---|---|
| *G06T 19/00* | (2011.01) | |
| *G05D 1/00* | (2006.01) | |
| *G06K 9/00* | (2006.01) | |
| *A47L 7/00* | (2006.01) | |
| *A47L 9/28* | (2006.01) | |

(Continued)

(52) U.S. Cl.
CPC .......... *A47L 7/0066* (2013.01); *A47L 7/0085* (2013.01); *A47L 9/281* (2013.01); *A47L 9/2826* (2013.01); *A47L 9/2857* (2013.01); *A47L 9/2894* (2013.01); *B25J 9/0003* (2013.01); *B25J 19/022* (2013.01); *B25J 19/023* (2013.01); *G05D 1/0044* (2013.01); *G06K 9/00671* (2013.01); *G06T 19/006* (2013.01); *A47L 2201/04* (2013.01); *A47L 2201/06* (2013.01)

(58) Field of Classification Search
CPC .... G06T 19/006; A47L 7/0066; A47L 7/0085; A47L 9/009; A47L 9/2805; A47L 9/281; A47L 9/2815; A47L 9/2826; A47L 9/2857; A47L 9/2894; A47L 11/4011; A47L 2201/04; A47L 2201/06; B25J 19/022; B25J 9/0003; B25J 19/023; G05D 1/0044; G05D 2201/0215; G06K 9/00671
See application file for complete search history.

(56) References Cited

U.S. PATENT DOCUMENTS

| | | | | |
|---|---|---|---|---|
| 2010/0145603 A1* | 6/2010 | Jung | .................. | G01C 21/3679 701/532 |
| 2013/0231779 A1* | 9/2013 | Purkayastha | .......... | B25J 9/1697 700/259 |

(Continued)

OTHER PUBLICATIONS

Hess, Jurgen Michael, "Efficient Approaches to Cleaning with Mobile Robots", Albert-Ludwigs-Universität Freiburg im Breisgau, 2015 (Year: 2015).*

*Primary Examiner* — Diane M Wills
(74) *Attorney, Agent, or Firm* — Dentons US LLP

(57) ABSTRACT

A robot cleaner includes a display unit, a camera unit configured to capture an image of a cleaning region when cleaning starts, a dust sensor configured to output a sensed signal corresponding to an amount of dust sucked in the cleaning region, and a control unit configured to calculate the amount of dust based on the sensed signal, to start an augmented reality (AR) mode when cleaning ends, to generate an AR image corresponding to the amount of dust, and to control the display module to superimpose the AR image on the image.

14 Claims, 18 Drawing Sheets

(51) Int. Cl.
*B25J 9/00* (2006.01)
*B25J 19/02* (2006.01)

(56) References Cited

U.S. PATENT DOCUMENTS

| | | | |
|---|---|---|---|
| 2014/0189563 A1* | 7/2014 | Kim | G08B 21/245 |
| | | | 715/771 |
| 2015/0182088 A1* | 7/2015 | Kim | A47L 9/2894 |
| | | | 15/319 |
| 2016/0022108 A1* | 1/2016 | Yoon | A47L 11/33 |
| | | | 134/18 |

\* cited by examiner

ROBOT CLEANER, METHOD OF OPERATING THE SAME, AND AUGMENTED REALITY SYSTEM

CROSS-REFERENCE TO RELATED APPLICATIONS

This application claims priority under 35 U.S.C. 119 and 365 to Korean Patent Application No. 10-2016-0111081, filed on Aug. 30, 2016 in the Korean Intellectual Property Office, the disclosure of which is incorporated herein by reference.

FIELD

The present invention relates to a robot cleaner, a method of operating the same, and an augmented reality (AR) system and, more particularly, to a robot cleaner for displaying a cleaned result using an AR image, a method of operating the same, and an augmented reality (AR) system.

BACKGROUND

The functions of a mobile terminal have gradually been diversified. Recently, the mobile terminal may apply augmented reality to display an image. Augmented reality (AR) is technology of superimposing a virtual image on a real image or background to display one image.

The mobile terminal may display a virtual image related to a real image to be superimposed on the real image projected by a camera mounted therein. The mobile terminal may provide a new interesting user experience (UX) to a user such that the user may easily acquire information related to the real image.

Meanwhile, various types of electronic devices for increasing user convenience are located in a living space of a user. A robot cleaner as an electronic device performs cleaning while autonomously traveling in an indoor space.

In general, the robot cleaner informs the user of a cleaned region and an uncleaned region, when cleaning performed along a traveling path is finished. However, currently, the robot cleaner does not inform the user of the state of the cleaned region before cleaning. Therefore, the user cannot know a degree of contamination of the cleaned region before cleaning. Further, the user cannot accurately check how well cleaning is performed by the robot cleaner.

SUMMARY

An object of the present invention is to provide a robot cleaner for displaying an augmented reality (AR) image for a cleaned result to enable a user to easily know a degree of contamination of a cleaned region before cleaning.

Another object of the present invention is to enable a user to accurately check how well cleaning is performed by a robot cleaner.

Another object of the present invention is to enable a user to intuitively check a degree of contamination and cleaned result of each cleaning region.

According to an aspect of the present invention, a robot cleaner includes a display unit, a camera unit configured to capture an image of a cleaning region when cleaning starts, a dust sensor configured to output a sensed signal corresponding to an amount of dust sucked in the cleaning region, and a control unit configured to calculate the amount of dust based on the sensed signal, to start an augmented reality (AR) mode when cleaning ends, to generate an AR image corresponding to the amount of dust, and to control the display module to superimpose the AR image on the image.

The dust sensor may include a light emitting diode configured to emit light and a phototransistor configured to output the sensed signal corresponding to an amount of light emitted from the light emitting diode, and a value of the sensed signal may be changed according to the amount of light changed by the amount of dust introduced into a region between the light emitting diode and the phototransistor.

The control unit may generate the AR image indicating virtual dust corresponding to the amount of dust.

When the amount of dust exceeds a predetermined reference amount, the control unit may generate the AR image, in which at least one of a size and color of the virtual dust is changed in correspondence with a difference between the amount of dust and the reference amount.

The control unit may generate a cleaning map along a traveling path from a cleaning start time and a cleaning end time, and control the display module to superimpose the cleaning map on the image and to superimpose the AR image on the cleaning map.

According to another aspect of the present invention, a method of operating a robot cleaner includes capturing an image of a cleaning region when cleaning starts, receiving a sensed signal corresponding to an amount of dust sucked in the cleaning region, calculating the amount of dust based on the sensed signal, generating an augmented reality (AR) image indicating virtual dust corresponding to the amount of dust when cleaning ends, and displaying the AR image to be superimposed on the image.

According to another aspect of the present invention, an augmented reality (AR) system includes a robot cleaner configured to generate an image of a cleaning region and data for generating an AR image indicating virtual dust for an amount of dust sucked in the cleaning region, when starting cleaning and a mobile terminal configured to request the data corresponding to the cleaning region from the robot cleaner upon capturing a real image of the cleaning region and to display the AR image generated based on the data to be superimposed on the real image upon receiving the data.

DETAILED DESCRIPTION OF THE PREFERRED EMBODIMENT

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

Terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), internet of things (IoT) terminal, and the like.

By way of non-limiting example only, further description will be made with reference to particular types of mobile terminals. However, such teachings apply equally to other types of terminals, such as those types noted above. In addition, these teachings may also be applied to stationary terminals such as desktop computers, and the like.

Figure 1:
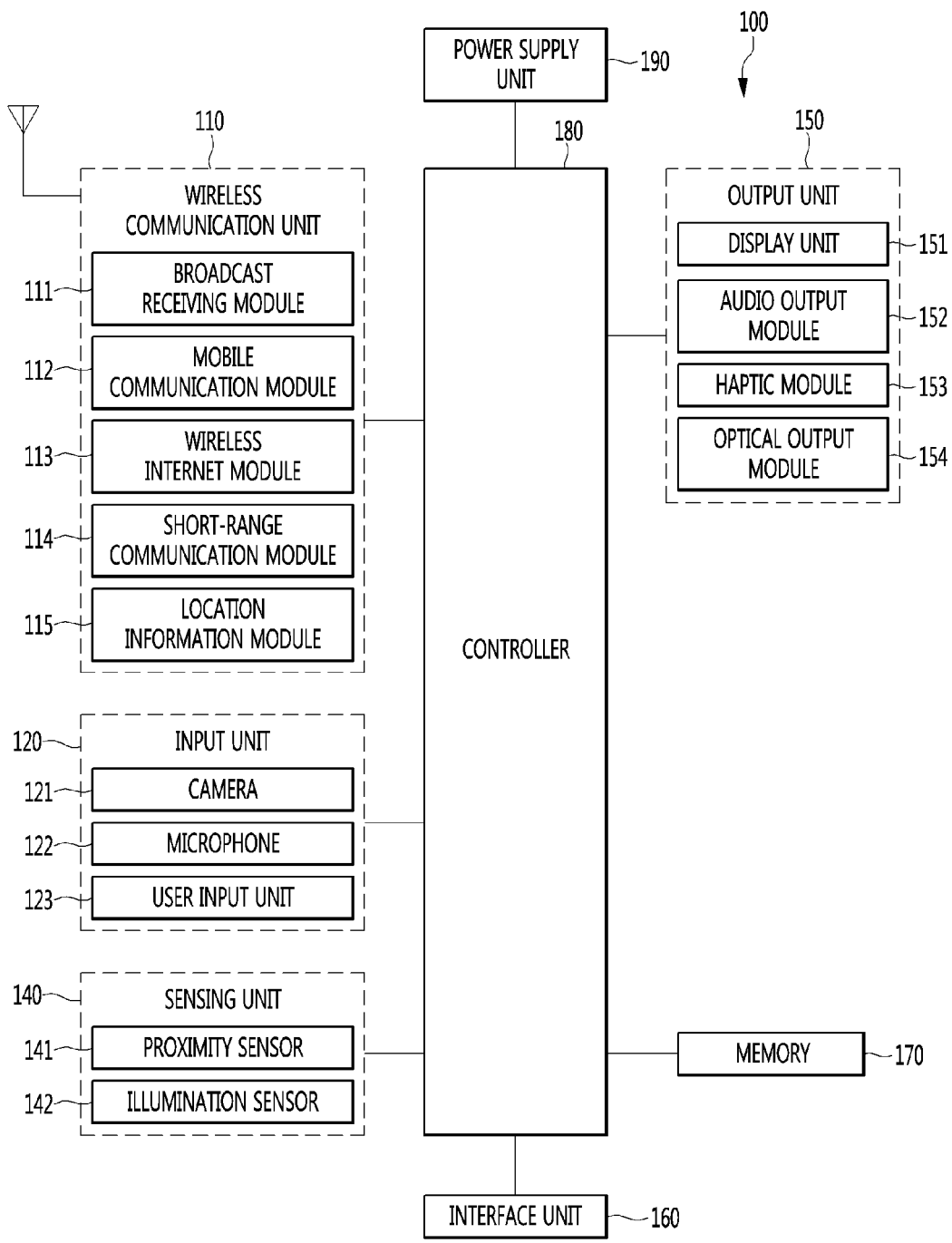
FIG. 1 is a block diagram of a mobile terminal in accordance with the present disclosure.

FIG. 1 is a block diagram of a mobile terminal in accordance with the present disclosure.

Referring to FIG. 1, the mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
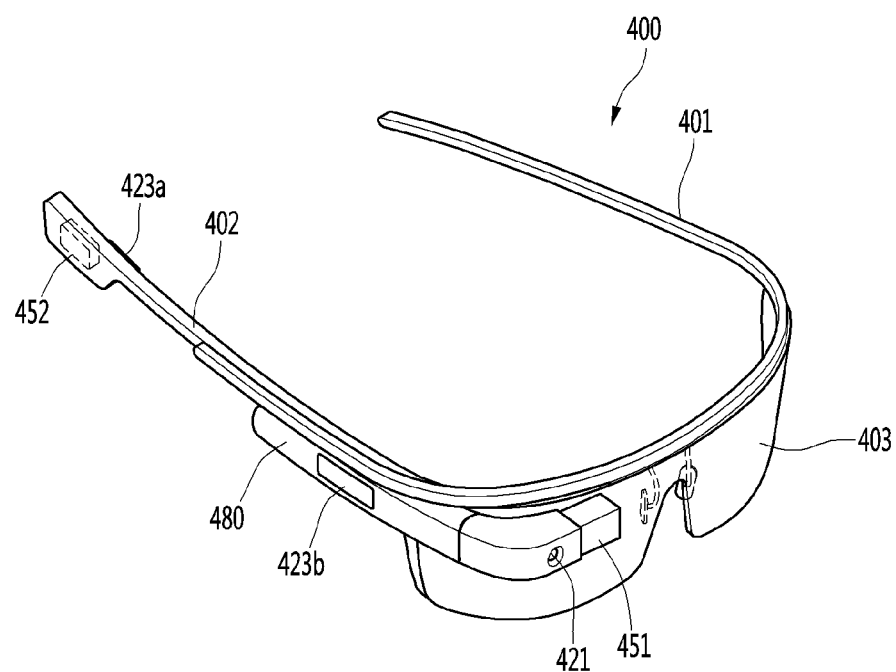
FIG. 2 is a perspective view illustrating one example of a glass-type mobile terminal according to another exemplary embodiment.

FIG. 2 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIG. 1.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (e.g., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Hereinafter, embodiments related to a method of displaying a cleaned result of a robot cleaner using an augmented reality (AR) image, which may be implemented in the mobile terminal 100 having the above-described configuration, will be described with reference to the accompanying drawings. However, those skilled in the art will appreciate that the present invention may be implemented in the form of a variety of formats without departing from the spirit or scope of the invention.

Figure 3:
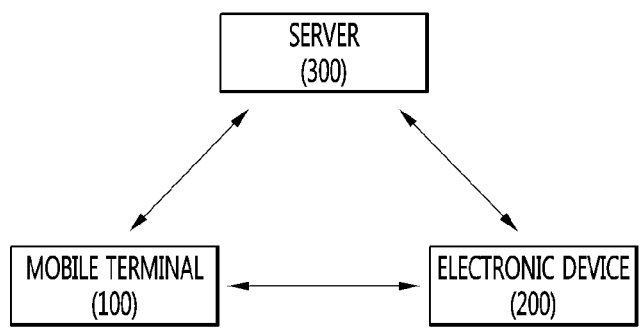
FIG. 3 is a diagram illustrating the configuration of an augmented reality system according to an embodiment of the present invention.

FIG. 3 is a diagram illustrating the configuration of an augmented reality (AR) system according to an embodiment of the present invention.

The AR system according to the embodiment of the present invention may include a mobile terminal 100, an electronic device 200 and a server 300.

The operation mode of the mobile terminal 100 may include an AR mode. The AR mode may refer to a mode for superimposing a virtual image on a real image to display one image. Here, the virtual image may be related to the real image and may include information on the real image.

The mobile terminal 100 may enter the AR mode by executing an application installed therein. Upon entering the AR mode, the mobile terminal 100 may automatically display a preview image acquired through the camera 121 on the display unit 151.

The mobile terminal 100 may identify the electronic device 200 through the preview image and provide information on the identified electronic device 200.

In one embodiment, the controller 180 of the mobile terminal 100 may identify the electronic device 200 using an image recognition scheme. The controller 180 of the mobile terminal 100 may identify the electronic device 200 based on the preview image of the electronic device 200 acquired through the camera 121.

The preview image may be an image which is displayed before being captured through the camera 121. The controller 180 may acquire the external image of the electronic device 200 included in the preview image and compare the acquired external image of the electronic device 200 with the external images of the electronic devices stored in the memory 170 of the mobile terminal 100.

When the acquired external image of the electronic device 200 is stored in the memory 170 as the result of comparison, the controller 180 may extract information on the stored electronic device. The information on the electronic device may be at least one of the name of the electronic device, the model name of the electronic device, information on parts provided in the electronic device, the image information of parts, and the position information of the internal parts of the electronic device.

When the acquired external image of the electronic device 200 is not stored in the memory 170 as the result of comparison, the controller 180 may access the server 300 including a database of the electronic device through the wireless Internet module 113. The server 300 may identify the electronic device 200 through comparison between the external image of the electronic device 200 and the stored external images of the electronic devices from the database.

The controller 180 may receive the information on the electronic device 200 identified by the server 300.

In another embodiment, the controller 180 may identify the electronic device 200 based on the identifier attached to the electronic device 200. The identifier may be any one of a barcode, a QR code and an RFID and may include information for identifying the electronic device 200.

The controller 180 may recognize the identifier included in the preview image acquired through the camera 121 and identify the electronic device 200.

In another embodiment, the controller 180 may identify the electronic device 200 based on the position information of the mobile terminal 100. Specifically, the controller 180 may identify the electronic device 200 displayed in the preview image through comparison between the position information of the mobile terminal 100 and the position information of the electronic device 200.

Although GPS information is preferably used as position information, it may be difficult to acquire GPS information indoors. Therefore, the controller 180 may use a method of providing a Wi-Fi position service (WPS) using the wireless Internet, a method of using Bluetooth, a method of using RFID, etc.

The short-range communication module 114 of the mobile terminal 100 may perform short-range wireless communication with the electronic device 200. To this end, the electronic device 200 may also include a short-range communication module.

The electronic device 200 may be any one of an air conditioner, a refrigerator, a washing machine, a TV, a microwave oven, a cleaner and an airport robot. However, the present invention is not limited thereto and the electronic device 200 may include all types of devices for increasing user convenience.

The server 300 may exchange information with the mobile terminal 100 through the Internet.

In some cases, the server 300 may be connected to the electronic device 200 through wireless communication. In this case, the electronic device 200 may also include a wireless Internet module.

Meanwhile, the electronic device 200 may be a robot cleaner 10. In this case, the AR system according to the embodiment of the present invention may include a robot cleaner 10 for performing cleaning while automatically traveling and a mobile terminal 100 for entering an AR mode and displaying the cleaned result of the robot cleaner 10 using an AR image.

Hereinafter, the configuration of the robot cleaner 10 will be described first.

Figure 4A:
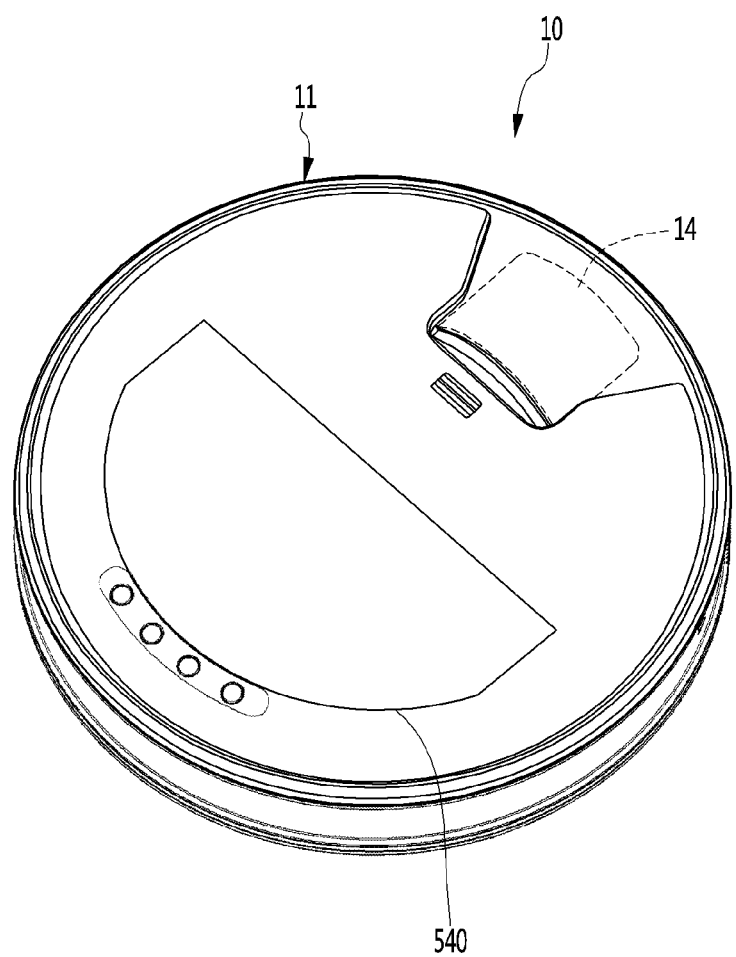
FIGS. 4A to 4C are diagrams illustrating the configuration of a robot cleaner according to an embodiment of the present invention.
Figure 4B:
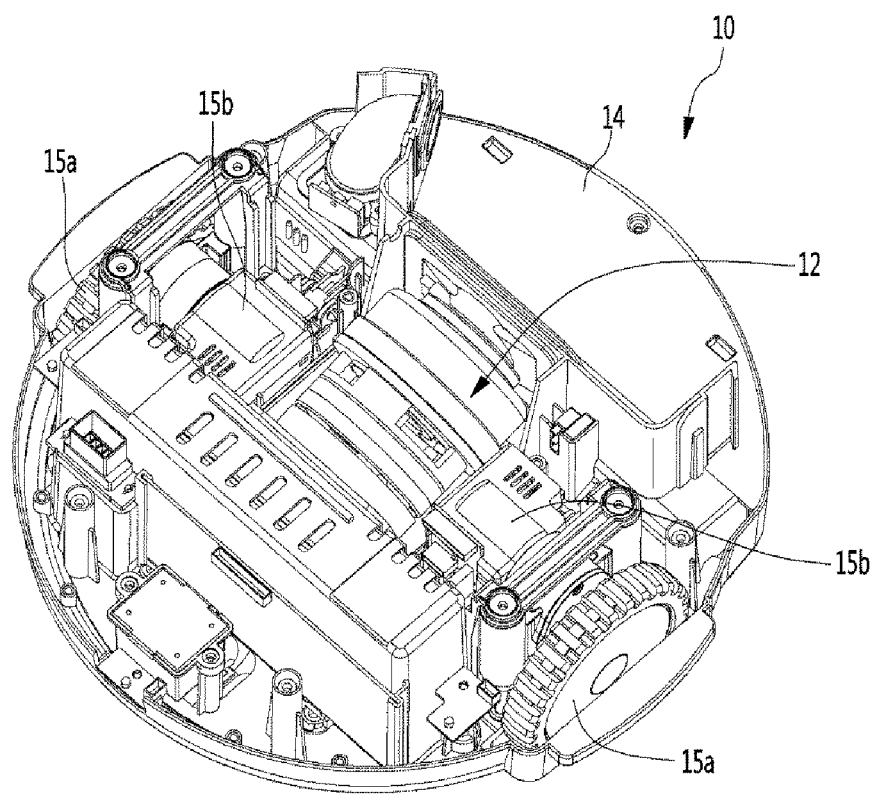
Figure 4C:
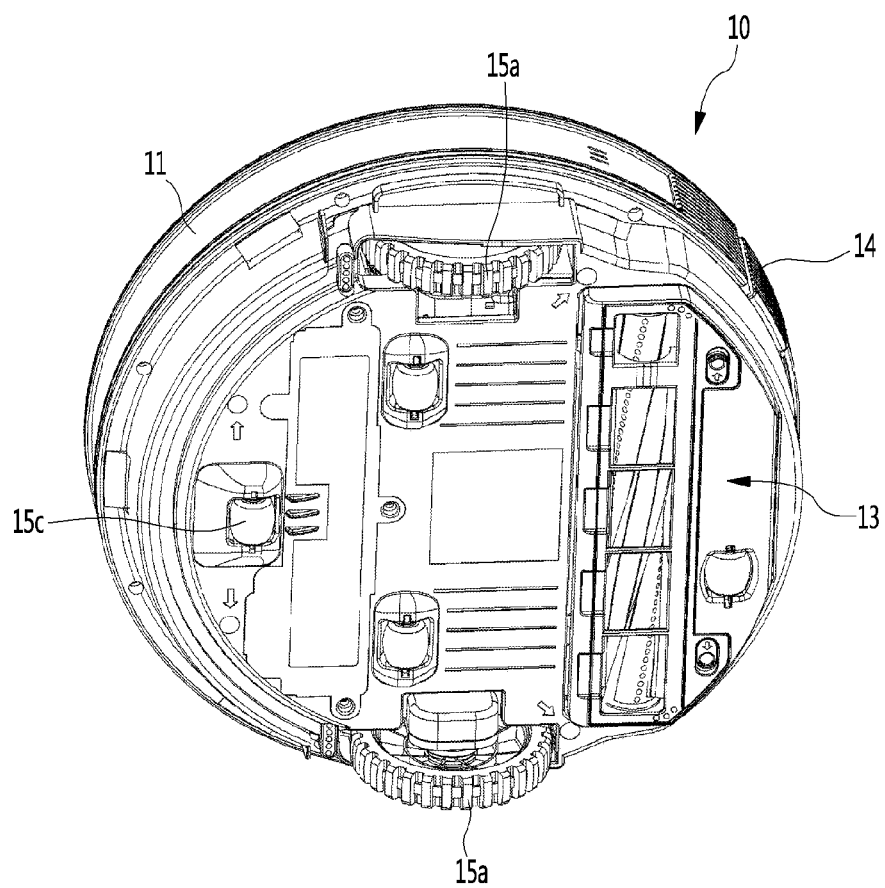

FIGS. 4A to 4C are diagrams illustrating the configuration of a robot cleaner according to an embodiment of the present invention.

Specifically, FIG. 4A is a perspective view showing the robot cleaner 10, FIG. 4B is a perspective view showing the internal configuration of the robot cleaner 10, and FIG. 4C is a perspective view showing the lower side of the robot cleaner 10.

The robot cleaner 10 according to the embodiment of the present invention may include a main body 11, a suction device 12, a suction nozzle 13, a dust collector 14, driving wheels 15a, motors 15b and an auxiliary wheel 15c.

The main body 11 forms the appearance of the robot cleaner 10.

The main body 11 may have a cylindrical shape and have a height that is less than a diameter thereof, that is, a flat cylindrical shape. In this case, the suction device 12, the suction nozzle 13, and the dust collector 14 communicating with the suction nozzle 13 may be provided in the main body 11.

The suction device 12 generates air suction force.

The dust collector 14 may be provided at the rear side of the suction device 12. In this case, the suction device 12 may include a motor (not shown) obliquely provided between a battery 560 and the dust collector 14 and electrically connected to the battery 560 and a fan (not shown) connected to the rotation shaft of the motor to forcibly flow air.

The suction nozzle 13 sucks in dust located on the floor by driving the suction device 12. Specifically, the suction nozzle 13 is exposed to the lower side of the main body 11 through an opening (not shown) formed in the bottom of the main body 11, thereby being in contact with the indoor floor. In this case, the suction nozzle 13 may suck in foreign materials on the floor along with air.

The dust collector 14 collects foreign materials in air sucked in by the suction nozzle 13. To this end, the suction nozzle 13 is provided at the lower side of the dust collector 14.

Meanwhile, a dust sensor (not shown) for sensing sucked dust may be provided in the main body 11. The dust sensor (not shown) will be described below with reference to FIG. 6.

A sensor (not shown) for sensing a distance from an indoor wall or an obstacle, a bumper (not shown) for absorbing impact upon collision, and the driving wheel 15a for moving the robot cleaner 10 may be provided on the outer circumferential surface of the main body 11.

The driving wheels 15a may be provided at the lower side of the main body 11. Specifically, the driving wheels 15a may be provided at both sides, that is, the left and right sides, of the lower side of the main body.

The driving wheels 15a are configured to rotate by the motors 15b controlled by the control unit 570. To this end, the motors 15b may be provided to correspond to the driving wheels 15a, that is, may be provided at both sides, the left and right sides, of the lower side of the main body. In this case, the motors 15b provided at the left and right sides may independently operate. Accordingly, the robot cleaner 10 may move forward or backward or turn left or right. Therefore, the robot cleaner 10 may perform indoor cleaning, while driving the motors 15b to autonomously change a direction thereof.

At least one auxiliary wheel 15c may be provided on the bottom of the main body 11. The auxiliary wheel 15c may minimize friction between the robot cleaner 10 and the floor and guide movement of the robot cleaner 10.

Meanwhile, the dust sensor (not shown) for sensing sucked dust may be provided in the main body 11. The dust sensor (not shown) will be described below with reference to FIG. 6.

Figure 5:
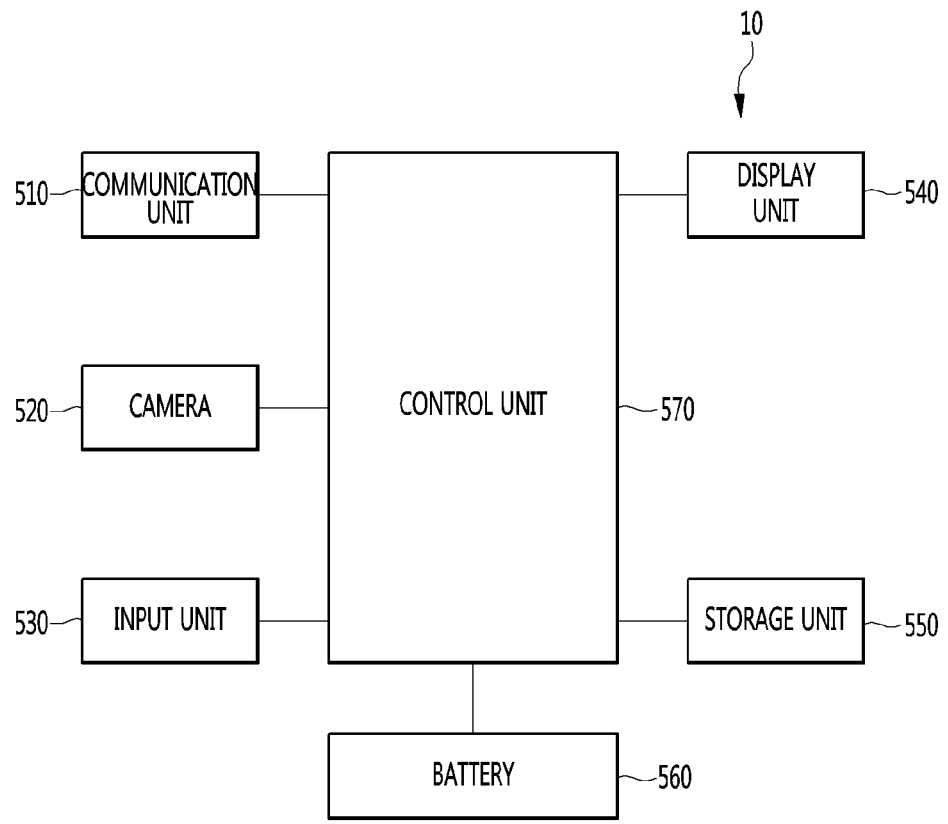
FIG. 5 is a block diagram showing the configuration of a robot cleaner according to an embodiment of the present invention.

FIG. 5 is a block diagram showing the configuration of a robot cleaner according to an embodiment of the present invention.

The robot cleaner 10 according to the embodiment of the present invention may include a communication unit 510, a camera 520, an input unit 530, a display unit 540, a storage unit 550, a battery 560 and a control unit 570.

The communication unit 510 may perform communication with the mobile terminal 100. The robot cleaner 10 may be controlled by the mobile terminal 100 or transmit or receive data and/or control commands to or from the mobile terminal 100.

Communication performed between the communication unit 510 and the mobile terminal 100 may include a variety of wired or wireless communication such as low-power Bluetooth communication, Bluetooth communication, RFID communication, infrared communication, wireless LAN communication, wireless Internet communication, etc. To this end, the communication unit 510 may include a communication module capable of performing wired/wireless communication.

The camera 520 generates image information of a predetermined region. Here, the predetermined region may include the robot cleaner 10 and the peripheral region of the robot cleaner 10. The camera 520 may capture the robot cleaner 10 and the peripheral region of the robot cleaner 10 and generate a still image or a moving image.

In one embodiment, in order to acquire image information of various regions, a plurality of cameras 520 may be provided in the robot cleaner 10. In this case, at least one of the plurality of cameras 520 may be provided at the upper side of the robot cleaner 10 and at least one of the cameras may be provided at the circumference of the side surface of the robot cleaner 10.

The input unit 530 may receive a command related to operation or control of the robot cleaner 100.

To this end, the input unit 530 may include a plurality of buttons configured in the form of a push key or a touch key. The plurality of buttons may include at least one of a confirm button for confirming an item related to operation of the robot cleaner 10, a setting button for setting an item related to operation of the robot cleaner 10, a delete button for deleting an input or set item, a start button for starting cleaning and a stop button for stopping cleaning.

Here, the command related to operation or control of the robot cleaner 10 may be a cleaning scheduling command, a cleaning start command and a cleaning end command. Alternatively, the command related to operation or control of the robot cleaner 10 may be a command related to setting of the cleaning pattern (or traveling pattern) of the robot cleaner 10. Here, the cleaning pattern may include at least one of a zigzag pattern, a random pattern, a per-cell pattern (a pattern for performing cleaning in a specific cell and then performing cleaning in a next cell) and a user setting pattern.

The display unit 540 may display information related to operation of the robot cleaner 10.

Specifically, operation information of the robot cleaner 10, image information acquired by the camera 520, cleaning map information of a cleaning region, time information of the robot cleaner 10 may be displayed on the display unit 540. Here, the cleaning region may include a target-of-cleaning region, a non-target-of-cleaning region, a cleaned region, an uncleaned region, etc. Hereinafter, in the present invention, the target-of-cleaning region means a region corresponding to a target of cleaning and the non-target-of-cleaning region means a region other than the target-of-cleaning region. In addition, the cleaned region means a region in which cleaning has already been performed and the uncleaned region means a region in which cleaning is not yet performed.

The display unit 540 may display the time information of the robot cleaner 10. In this case, the time information of the robot cleaner 10 may include at least one of a cleaning start time, a cleaning end time, a time required for cleaning, a residual time, an estimated time and a current time.

The storage unit 550 may store data.

Specifically, the target-of-cleaning region, the non-target-of-cleaning region, the cleaned region and the uncleaned region may be distinguishably stored in the storage unit 550 in association with the cleaning process. In this case, data on the target-of-cleaning region, the non-target-of-cleaning region, the cleaned region and the uncleaned region may be periodically updated in correspondence with operation of the robot cleaner 10.

The battery 560 may supply power to the robot cleaner 10 and the components thereof. The battery 560 may be a built-in battery or a replaceable battery. In this case, the battery 560 is rechargeable and may be detachably coupled to the main body for charging.

When the robot cleaner 10 is connected to a docking station, the battery 560 may be charged by power received from the docking station. According to one embodiment, when cleaning operation is finished, the robot cleaner 10 may be automatically switched to a docking mode and moved and connected to the docking station.

The control unit 570 may be connected to the various components included in the robot cleaner 10 to control overall operation of the robot cleaner 10. Such a control unit 570 may be provided in the main body 11 at a predetermined position.

According to one embodiment, the control unit 570 may map a real space where the robot cleaner 10 is located and a virtual space displayed on the screen of the mobile terminal 100. To this end, the control unit 570 maps two-dimensional coordinates of the real space to three-dimensional coordinates of the virtual space.

In general, the robot cleaner 10 travels on the plane and does not travel in a vertical direction. Accordingly, the coordinates of the real space of the robot cleaner 10 may be represented by two-dimensional coordinates (x, y).

In contrast, the virtual space displayed on the screen of the mobile terminal 100 is a three-dimensional space. Accordingly, the coordinates of the virtual space of the robot cleaner 10 may be represented by three-dimensional coordinates (X, Y, Z).

In this case, the control unit 570 may map the coordinates of the real space of the robot cleaner 10 to the coordinates of the virtual space. Therefore, the real region where the robot cleaner 10 is located may be mapped to the virtual region displayed on the screen of the mobile terminal 100.

The control unit 570 may generate the position information of the real space of the robot cleaner 10 using the image information captured by the camera 520. In addition, the robot cleaner 10 may acquire the image information displayed on the screen of the mobile terminal 100 from the mobile terminal 100. In this case, the robot cleaner may map the real cleaning region to the three-dimensional region displayed on the screen of the mobile terminal 100 based on the position information, the traveling information and the image information displayed on the screen of the mobile terminal 100. Meanwhile, in some embodiments, mapping of the real space to the virtual space may be performed by the mobile terminal 100, instead of the robot cleaner 10.

The robot cleaner 10 according to the embodiment of the present invention may further include a sound output unit (not shown). The sound output unit (not shown) may audibly output operation information of the robot cleaner 10. In addition, the sound output unit (not shown) may audibly output information received from an external device. For example, when the robot cleaner 10 receives control information or text information from the mobile terminal 100, the robot cleaner 10 may convert the control information or the text information into sound and output sound. According to one embodiment, the sound output unit (not shown) may be a speaker.

Figure 6:
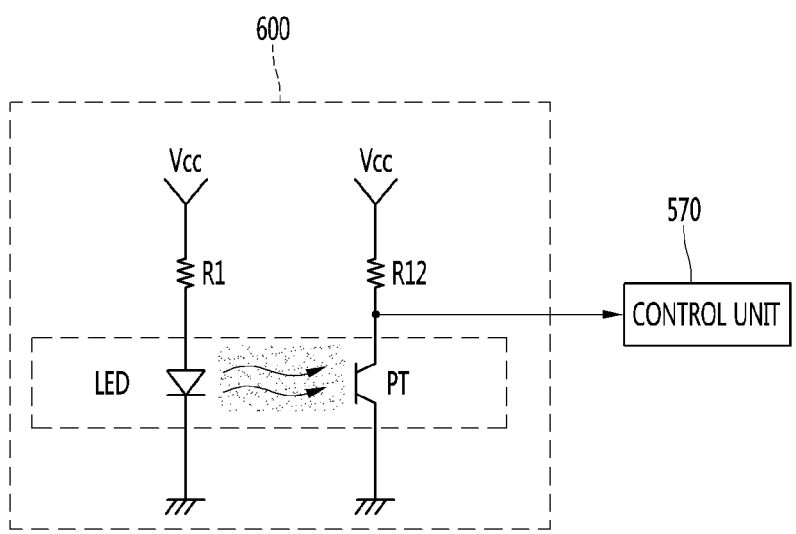
FIG. 6 is a diagram illustrating operation of a dust sensor included in a robot cleaner according to an embodiment of the present invention.

FIG. 6 is a diagram illustrating operation of a dust sensor included in a robot cleaner according to an embodiment of the present invention.

The dust sensor 600 may sense sucked dust.

Specifically, the dust sensor 600 senses dust sucked in through a suction pipe (not shown) and outputs a sensed signal corresponding thereto. In this case, the control unit 570 connected to the dust sensor 600 may calculate the amount of sucked dust based on the output sensed signal.

As shown in FIG. 6, when dust is sucked into a region between a light emitting diode (LED) for emitting light and a phototransistor (PT) for receiving the emitted light in the dust sensor 600, the amount of light received by the phototransistor (PT) is changed due to sucked dust. In this case, the control unit 570 may calculate the amount of dust corresponding to the value of the sensed signal corresponding to the changed amount of light.

Figure 7:
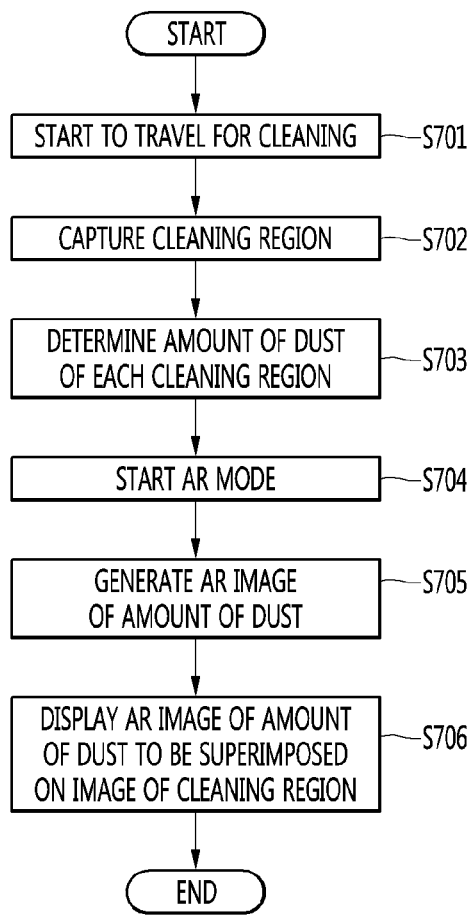
FIG. 7 is a diagram showing a process of operating a robot cleaner according to an embodiment of the present invention.

FIG. 7 is a diagram showing a process of operating a robot cleaner according to an embodiment of the present invention.

The robot cleaner 10 starts to travel for cleaning (S701).

In this case, the robot cleaner 10 may start to travel for cleaning according to a set cleaning pattern. Here, the cleaning pattern may include at least one of a zigzag pattern, a random pattern, a per-cell pattern (a pattern for performing cleaning in a specific cell and then performing cleaning in a next cell) and a user setting pattern.

The robot cleaner 10 captures a cleaning region (S702).

Here, the cleaning region of the robot cleaner 10 may include the robot cleaner 10 and/or the peripheral region of the robot cleaner 10. Therefore, the robot cleaner 10 may acquire the image of the cleaning region.

The robot cleaner 10 may determine the amount of dust in each cleaning region (S703).

The cleaning region may include a plurality of regions. In this case, the amounts of dust respectively detected in the plurality of regions may be different. Accordingly, the robot cleaner 10 may determine the amount of dust of each cleaning region.

Based on the amount of dust of each cleaning region, the robot cleaner 10 may set a traveling path or correct the set traveling path. For example, in a cleaning region in which the amount of dust is large, the traveling pattern of the robot cleaner 10 may be densely configured to travel in more regions.

The robot cleaner 10 starts the AR mode when cleaning is finished (S704).

According to one embodiment, if a real image is included in the screen of the camera mounted in the robot cleaner 10, the robot cleaner 10 may activate the AR mode.

In this case, the real image is included in the screen projected by the camera and such a screen may be a real image or background, on which an AR image is superimposed.

The robot cleaner 10 generates the AR image of the amount of dust (S705).

AR means that a virtual image is superimposed on a real image to display one image. Specifically, AR may mean that a virtual image artificially generated by a computer is displayed on an image of the real world. In the present invention, the virtual image included in AR is defined as an AR image.

The AR image may include information on an object present in the real world. Here, the object may include all types of things, animals or plants, persons, etc. configuring the real world, such as electronic devices, components or parts, things or articles, buildings, etc.

The AR image may be displayed in various shapes or colors according to the characteristics of an object to be displayed.

The AR image of the robot cleaner 10 may include an amount of dust, a traveling path, an estimated cleaning path, and the components, operations, functions, or states of the robot cleaner 10. In the case of an AR image of the amount of dust, in order to generate virtual dust, the robot cleaner 10 may generate an AR image based on the amount of dust sensed by the dust sensor 600.

In other words, the robot cleaner 10, that is, the control unit 570, may calculate the amount of dust according to the value of the sensed signal output from the dust sensor 600.

At this time, the control unit 570 may change at least one of the color and size of the virtual dust in correspondence with the amount of dust.

That is, when the amount of dust exceeds a predetermined reference amount, the control unit 570 may change at least one of the color and size of the virtual dust in correspondence with a difference between the amount of dust and the reference amount.

For example, the control unit 570 may generate an AR image in which the size of the virtual dust is changed to be greater than a reference size corresponding to the reference amount by the difference.

In addition, the control unit 570 may generate an AR image in which the color of the virtual dust is changed to be darker than a reference color corresponding to the reference amount by the difference.

At this time, a user may determine that the detected amount of dust is increased as the size of the virtual dust is increased. In addition, the user may determine that the detected amount of dust is increased as the color of the virtual dust darkens.

In addition, when the amount of dust does not exceed the reference amount, the control unit 570 may generate an AR image in which the size of the virtual dust is less than the reference size corresponding to the reference amount or the color of the virtual dust is brighter than the reference color corresponding to the reference amount, without being limited thereto.

The robot cleaner 10 may display the AR image of the amount of dust to be superimposed on the image of the cleaning region (S706).

Specifically, the robot cleaner 10 may display the AR image to be superimposed on the image of the real region projected by the built-in camera. For example, the robot cleaner 10 may display the AR image of the amount of sucked dust to be superimposed on the image including the region in which cleaning has been performed.

In this case, the mobile terminal 100 may distinguishably display the AR image and the real image. For example, the mobile terminal 100 may display the AR image as a stereoscopic image or a holographic image or may display the AR image as a moving image including an animation or video.

In addition, the mobile terminal 100 may display information on the AR image in text form, along with the AR image.

Figure 8A:
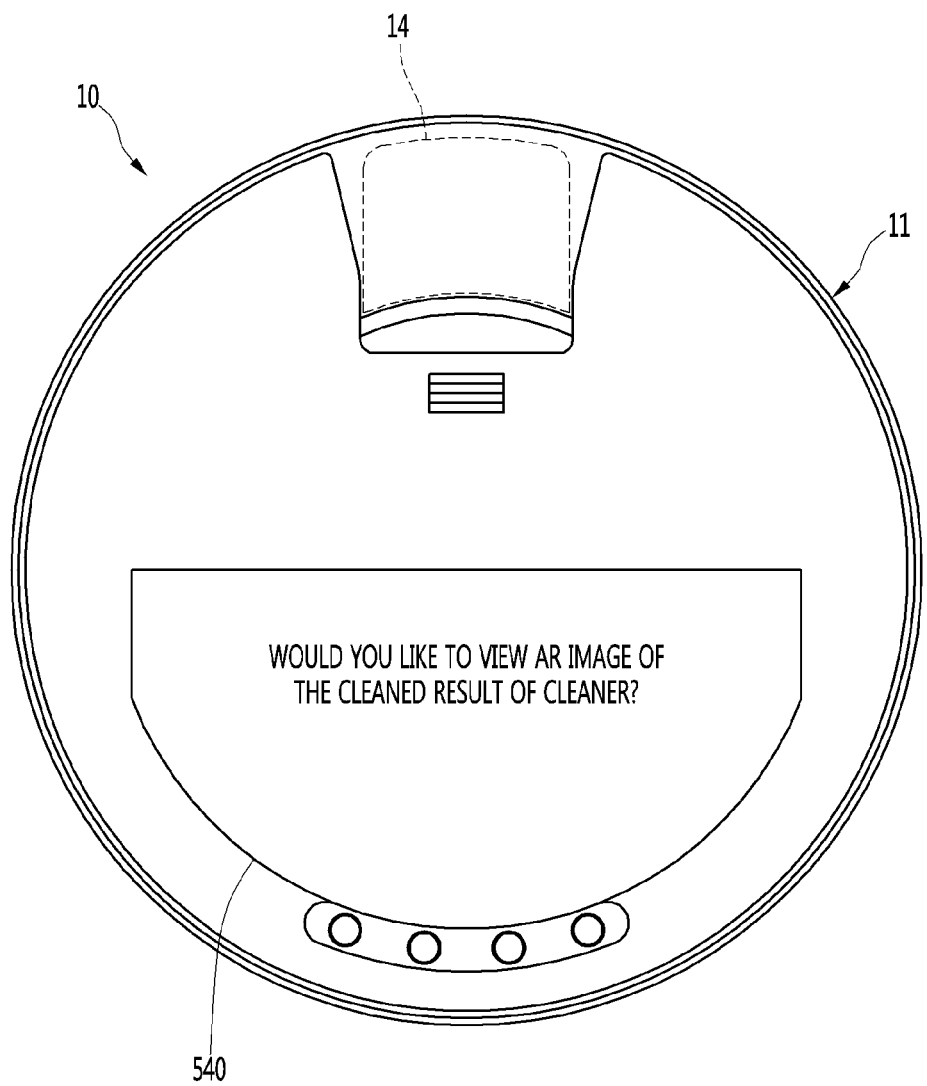
FIGS. 8A to 8C are diagrams illustrating an example of displaying a cleaned result of a robot cleaner using an AR image according to an embodiment of the present invention.
Figure 8B:
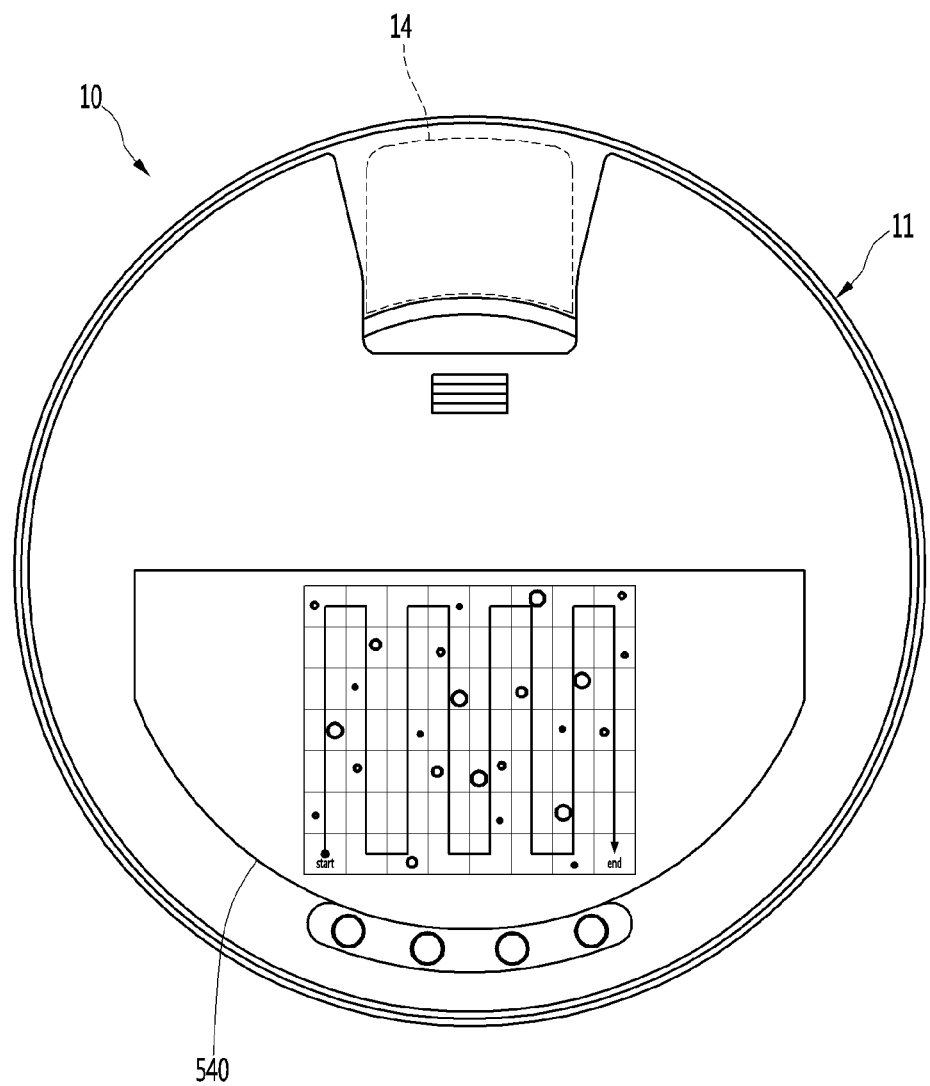
Figure 8C:
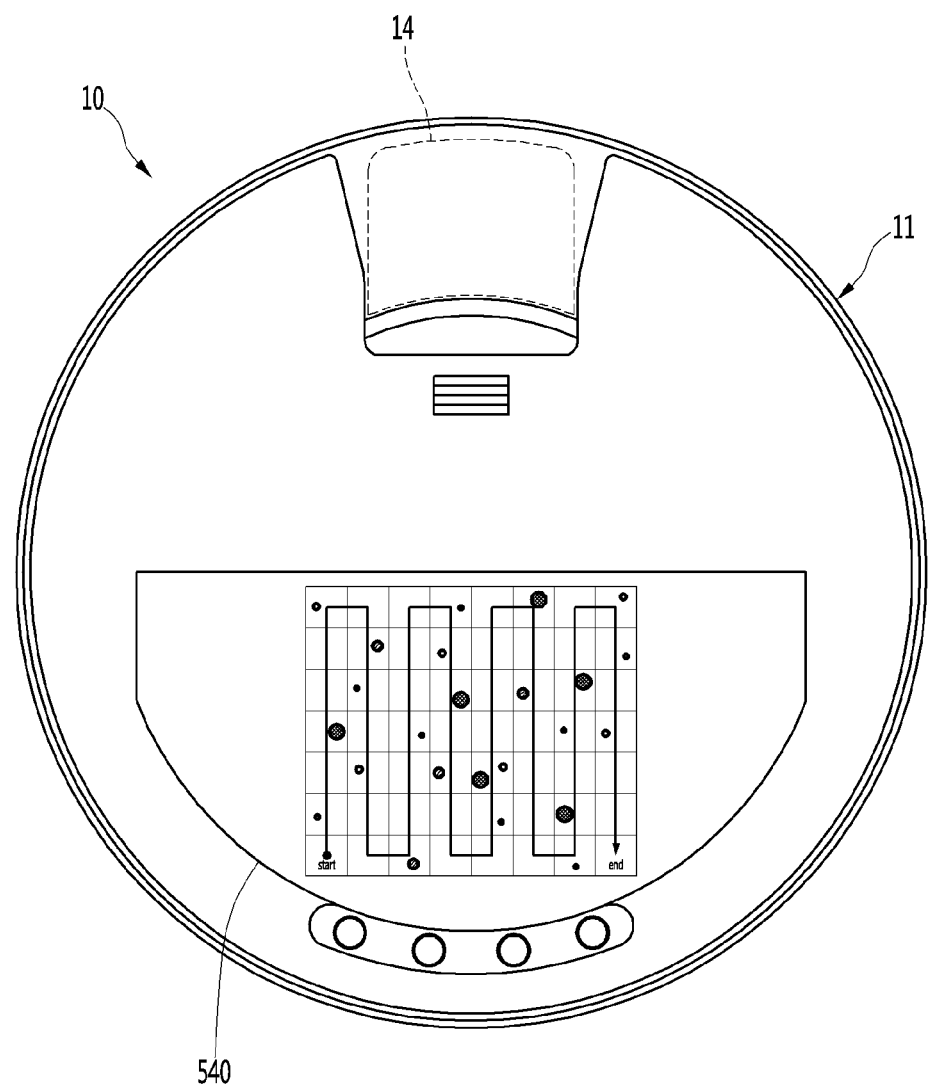

FIGS. 8a to 8c are diagrams illustrating an example of displaying a cleaned result of a robot cleaner using an AR image according to an embodiment of the present invention.

The robot cleaner 10 may display the cleaned result using an AR image. Here, the cleaned result may include the amount of sucked dust, the traveling path, the cleaning region, etc.

When the robot cleaner 10 is traveling for cleaning, the user cannot know the cleaned state of a region in which cleaning is currently being performed, but can check only the state in which cleaning is finished. Accordingly, currently, the user cannot check the cleaned result of the robot cleaner 10.

However, the user needs to check the cleaned result of the robot cleaner 10, upon setting the traveling pattern of the robot cleaner 10. Accordingly, in the present embodiment, the robot cleaner 10 displays the cleaned result using an AR image.

The AR image of the cleaned result may be displayed on the display unit 540 of the robot cleaner 10. To this end, the robot cleaner 10 may display a message for inquiring whether the cleaned result is displayed using the AR image, when the image of the real region is included in the screen captured by the built-in camera. Such a message may be displayed on the display unit 540.

Referring to FIG. 8A, a text message for inquiring whether the cleaned result is displayed using an AR image is displayed on the display unit 540 of the robot cleaner 10.

FIG. 8B shows an example of displaying virtual dust on a cleaning map.

Virtual dust may be displayed on the cleaning map generated along the traveling path when the robot cleaner 10 travels for cleaning, that is, from a cleaning start time to a cleaning end time. In this case, the size of virtual dust may be changed in correspondence with the amount of dust. Specifically, as described above, the size of the virtual dust may be increased as the amount of dust sucked in by the robot cleaner 10 becomes greater than the reference amount. In addition, the size of the virtual dust may be decreased as the amount of dust sucked in by the robot cleaner 10 becomes less than the reference amount. Therefore, the user can easily check the degree of contamination of the cleaning region based on the cleaned result of the robot cleaner 10.

Referring to FIG. 8B, virtual dust particles having the same color are displayed on the cleaning map. In this case, the size of the virtual dust is proportional to the amount of dust. The user may intuitively check the cleaned result of the cleaning region through the virtual dust.

FIG. 8C shows another example of displaying virtual dust on a cleaning map.

Virtual dust may be displayed on the cleaning map generated along the traveling path when the robot cleaner 10 travels for cleaning, that is, from a cleaning start time to a cleaning end time. In this case, the color and size of virtual dust may be changed in correspondence with the amount of dust. Specifically, as described above, the color of the virtual dust may become darker and the size of the virtual dust may be increased as the amount of dust sucked in by the robot cleaner 10 becomes greater than the reference amount. The color of the virtual dust may become brighter and the size of the virtual dust may be decreased as the amount of dust sucked in by the robot cleaner 10 becomes less than the reference amount.

Therefore, the user can easily check the degree of contamination and cleaned result of the cleaning region based on the cleaned result of the robot cleaner 10.

Referring to FIG. 8C, virtual dust particles having different colors and sizes are displayed on the cleaning map. In this case, the size of the virtual dust is proportional to the amount of dust. In addition, the color of the virtual dust is proportional to the amount of dust. Therefore, the user may intuitively check the cleaned result of the cleaning region based on the virtual dust.

Figure 9A:
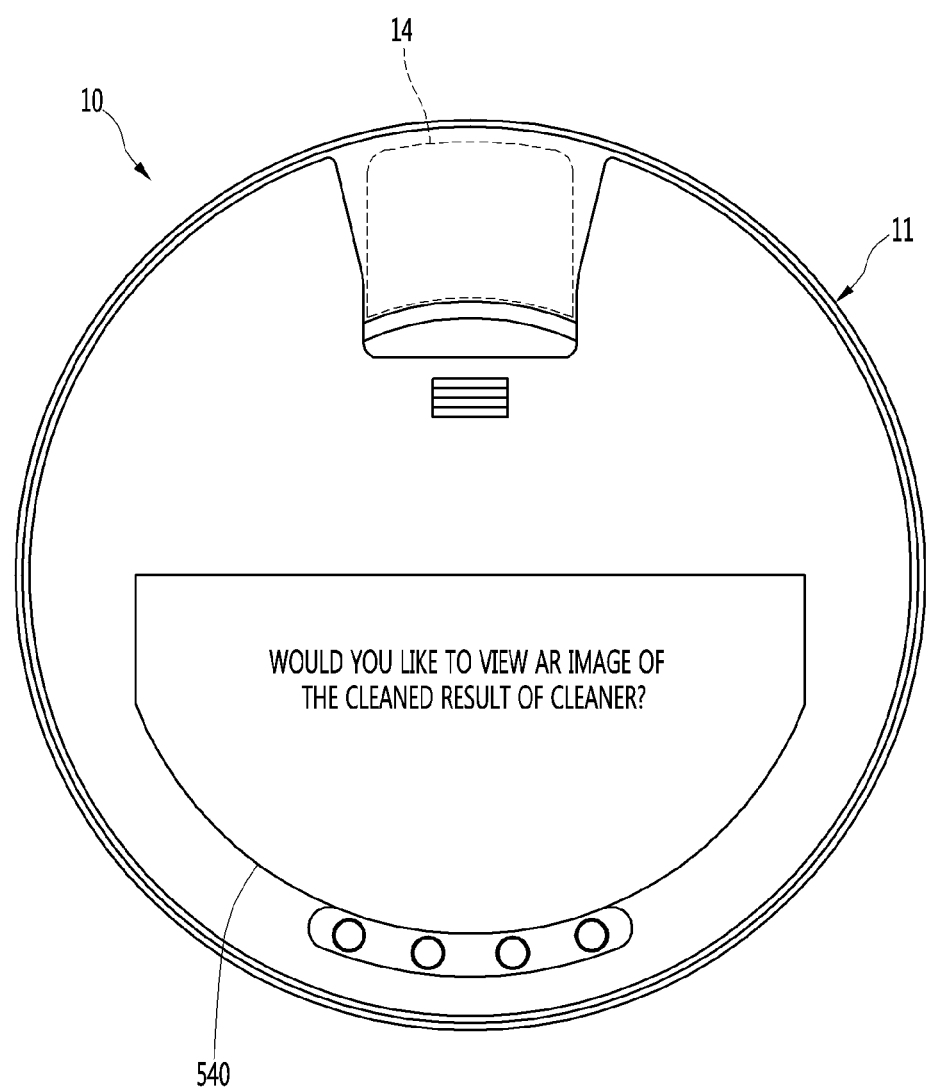
FIGS. 9A to 9C are diagrams illustrating another example of displaying a cleaned result of a robot cleaner using an AR image according to an embodiment of the present invention.
Figure 9B:
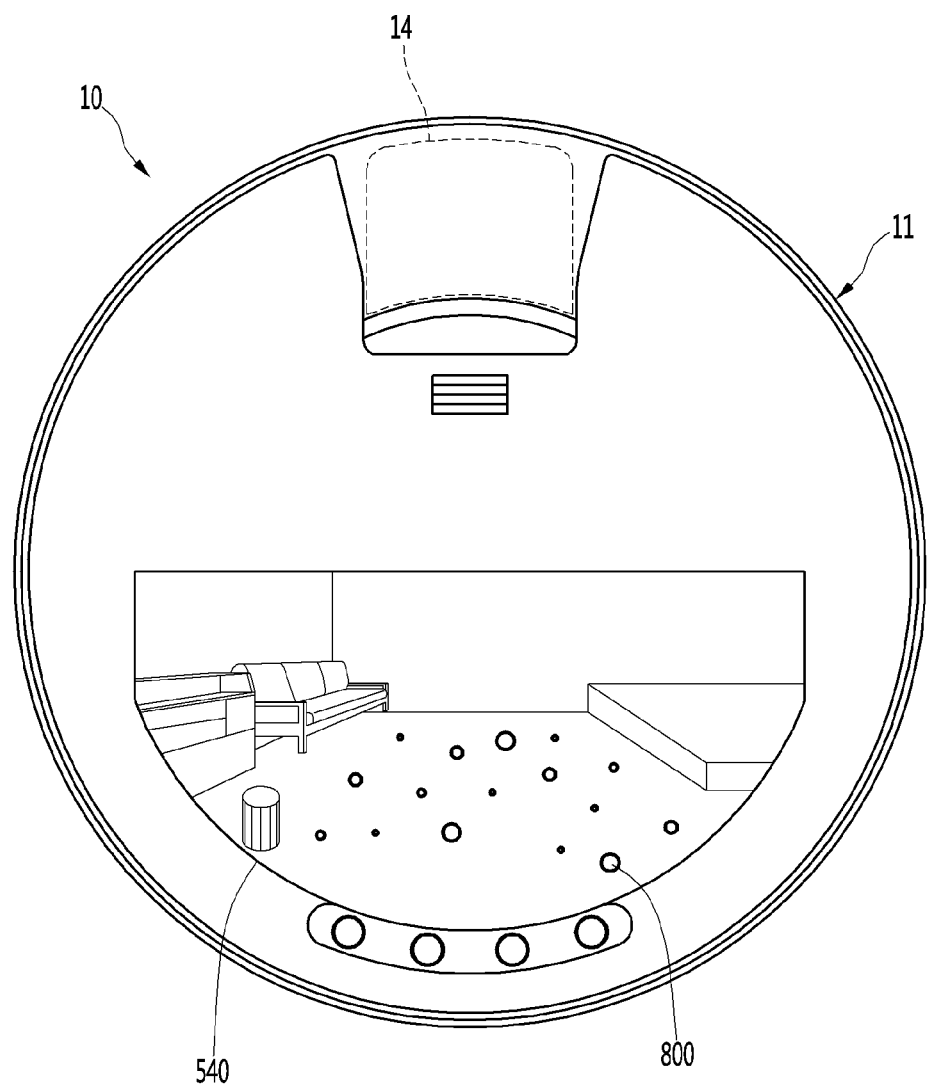
Figure 9C:
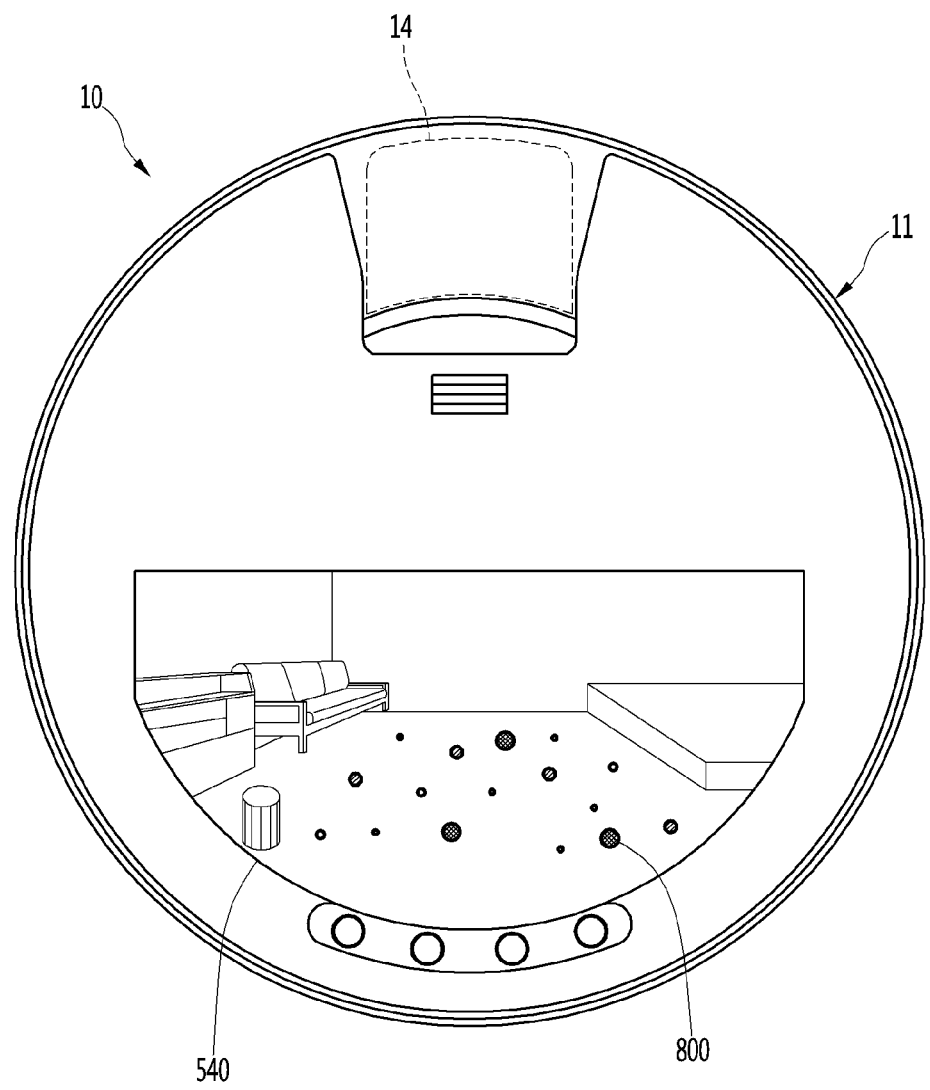

FIGS. 9A to 9C are diagrams illustrating another example of displaying a cleaned result of a robot cleaner using an AR image according to an embodiment of the present invention.

The robot cleaner 10 may display the cleaned result using the AR image. Here, the cleaned result includes the amount of sucked dust, the traveling path, the cleaning region, etc.

The AR image of the cleaned result may be displayed on the display unit 540 of the robot cleaner 10. To this end, the robot cleaner 10 may display a message for inquiring whether the cleaned result is displayed using the AR image, if the image of the real region is included in the screen by the built-in camera. Such a message may be displayed on the display unit 540.

Referring to FIG. 9A, a text message for inquiring whether the cleaned result is displayed using the AR image is displayed on the display unit 540 of the robot cleaner 10.

FIG. 9B shows an example of displaying virtual dust on the image of the cleaned region.

The robot cleaner 10 may display the virtual dust on the image of the cleaning region captured while traveling for cleaning. In this case, the size of the virtual dust may be changed in correspondence with the amount of dust. Specifically, as the amount of dust sucked in by the robot cleaner 10 is increased, the size of the virtual dust may be increased. In contrast, as the amount of dust sucked in by the robot cleaner 10 is decreased, the size of the virtual dust may be decreased. Therefore, the user can easily check the degree of contamination of the cleaning region based on the size of the virtual dust displayed on the real image.

Referring to FIG. 9B, virtual dust particles having the same color are displayed on the image of the cleaning region. In this case, the size of the virtual dust is proportional to the amount of dust. The user may intuitively check the cleaned result of the cleaning region through the virtual dust.

FIG. 9C shows another example of displaying virtual dust on the image of the cleaning region.

The robot cleaner 10 may display the virtual dust on the image of the cleaning region captured while traveling for cleaning. In this case, the color and size of the virtual dust may be changed in correspondence with the amount of dust. Specifically, as the amount of dust sucked in by the robot cleaner 10 is increased, the color of the virtual dust may become darker and the size of the virtual dust may be increased. As the amount of dust sucked in by the robot cleaner 10 is decreased, the color of the virtual dust becomes brighter and the size of the virtual dust may be decreased.

Therefore, the user can easily check the degree of contamination and cleaned result of the cleaning region based on the cleaned result of the robot cleaner 10.

Referring to FIG. 9C, virtual dust particles having different colors and sizes are displayed on the image of the cleaning region. In this case, the size of the virtual dust is proportional to the amount of dust. In addition, the color of the virtual dust is proportional to the amount of dust. Therefore, the user may intuitively check the cleaned result of the cleaning region based on the virtual dust.

In the embodiment, the robot cleaner 10 may display the AR image of the virtual dust on the cleaning map on the display unit 540 as shown in FIGS. 8B to 8C and display the AR image of the virtual dust on the image of the cleaning region on the display unit 540 as shown in FIGS. 9B and 9C.

In addition, the robot cleaner 10 may simultaneously display the AR image of the virtual dust and the cleaning map on the image of the cleaning region on the display unit 540.

Figure 10:
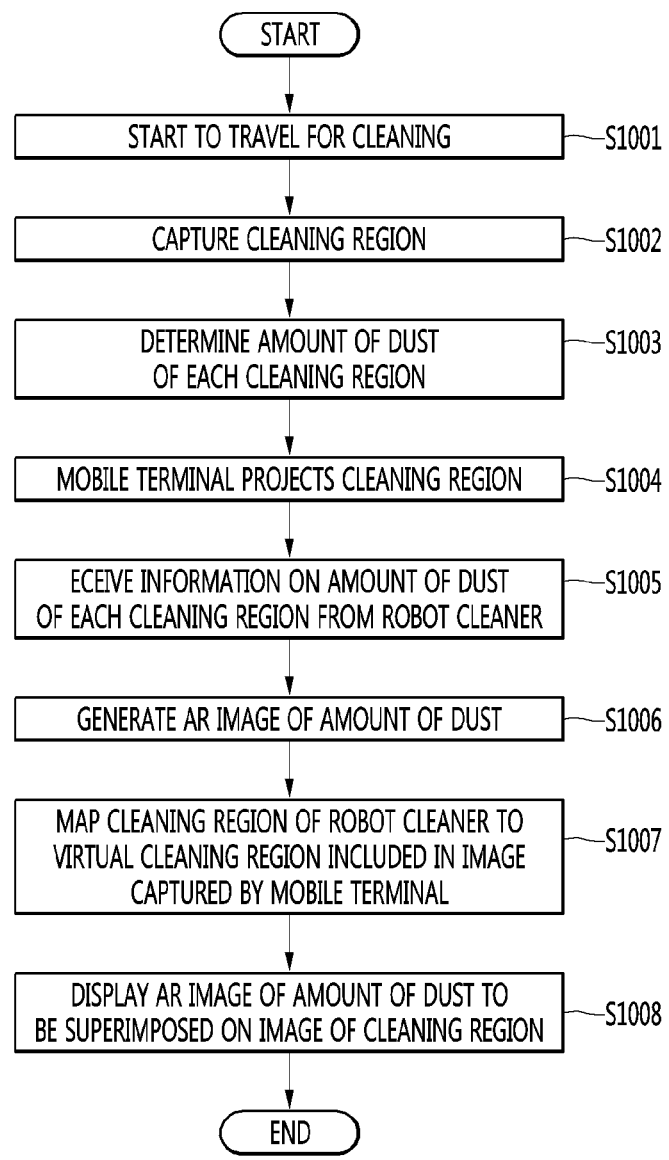
FIG. 10 is a diagram showing a process of operating a mobile terminal according to an embodiment of the present invention.

FIG. 10 is a diagram showing a process of operating a mobile terminal according to an embodiment of the present invention.

According to the present embodiment, the mobile terminal 100 may activate the AR mode and display the AR image of the amount of dust on the image of the cleaning region displayed on the screen by the camera provided in the mobile terminal 100.

The robot cleaner 10 starts to travel for cleaning (S1001).

In this case, the robot cleaner 10 may start to travel for cleaning according to a predetermined cleaning pattern. Here, the cleaning pattern may include at least one of a zigzag pattern, a random pattern, a per-cell pattern (a pattern for performing cleaning in a specific cell and then performing cleaning in a next cell) and a user setting pattern.

The robot cleaner 10 captures the cleaning region (S1002).

Here, the cleaning region of the robot cleaner 10 may include the robot cleaner 10 and/or the peripheral region of the robot cleaner 10. Therefore, the robot cleaner 10 may acquire the image of the cleaning region.

The robot cleaner 10 may determine the amount of dust of each cleaning region (S1003).

The cleaning region may include a plurality of regions. In this case, the amounts of dust respectively detected in the plurality of regions may be different. Accordingly, the robot cleaner 10 may calculate the amount of dust of each cleaning region.

Based on the amount of dust of each cleaning region, the robot cleaner 10 may set a traveling path or correct the set traveling path. For example, the traveling pattern of the robot cleaner is densely configured in a region in which the amount of dust is large, thereby increasing the number of times of traveling as compared to the other cleaning regions.

The mobile terminal 100 projects the cleaning region (S1004).

Specifically, the mobile terminal 100 may display the cleaning region on the screen by the built-in camera. In this case, the mobile terminal 100 may start the AR mode.

The cleaning region as the real image is included in the screen projected by the camera, and such a screen becomes the real image or background, on which the AR image is superimposed.

The mobile terminal 100 receives, from the robot cleaner 10, information on the amount of dust in each cleaning region (S1005).

To this end, the mobile terminal 100 requests data on the amount of dust of each cleaning region from the robot cleaner 10 and receives the data on the amount of dust of each cleaning region from the robot cleaner 10.

The mobile terminal 100 generates an AR image of the amount of dust based on the data on the amount of dust of each cleaning region (S1006).

Here, the AR image of the amount of dust may be a virtual image. In this case, the mobile terminal 100 may differently display at least one of the size and color of the virtual dust in correspondence with the amount of dust. For example, the mobile terminal 100 may increase the size of the virtual dust or darken the color of the virtual dust as the amount of dust detected in the region is increased.

The mobile terminal 100 maps the cleaning region of the robot cleaner 10 to a virtual cleaning region included in the image captured by the mobile terminal 100 (S1007).

The data on the amount of dust of each cleaning region is measured by the robot cleaner 10. In this case, the robot cleaner 10 determines the position of dust based on the coordinates of a real space where the robot cleaner 10 is located. Accordingly, the mobile terminal 100 maps the position of the dust in the real space to the position of the dust in the virtual space, in order to display the AR image of dust at an accurate position.

The mobile terminal 100 may display the AR image of the amount of dust to be superimposed on the image of the cleaning region (S1108).

According to the present embodiment, the cleaning region is displayed using the camera of the mobile terminal, thereby checking the cleaned result of the cleaning region through the AR image. If the cleaned result is displayed on the screen of the mobile terminal 100, there is no limitation on the size of the screen as compared to the screen of the robot cleaner. Further, if the cleaned result is displayed to be superimposed on the real image using the AR image, a recognition rate thereof is increased.

Figure 11A:
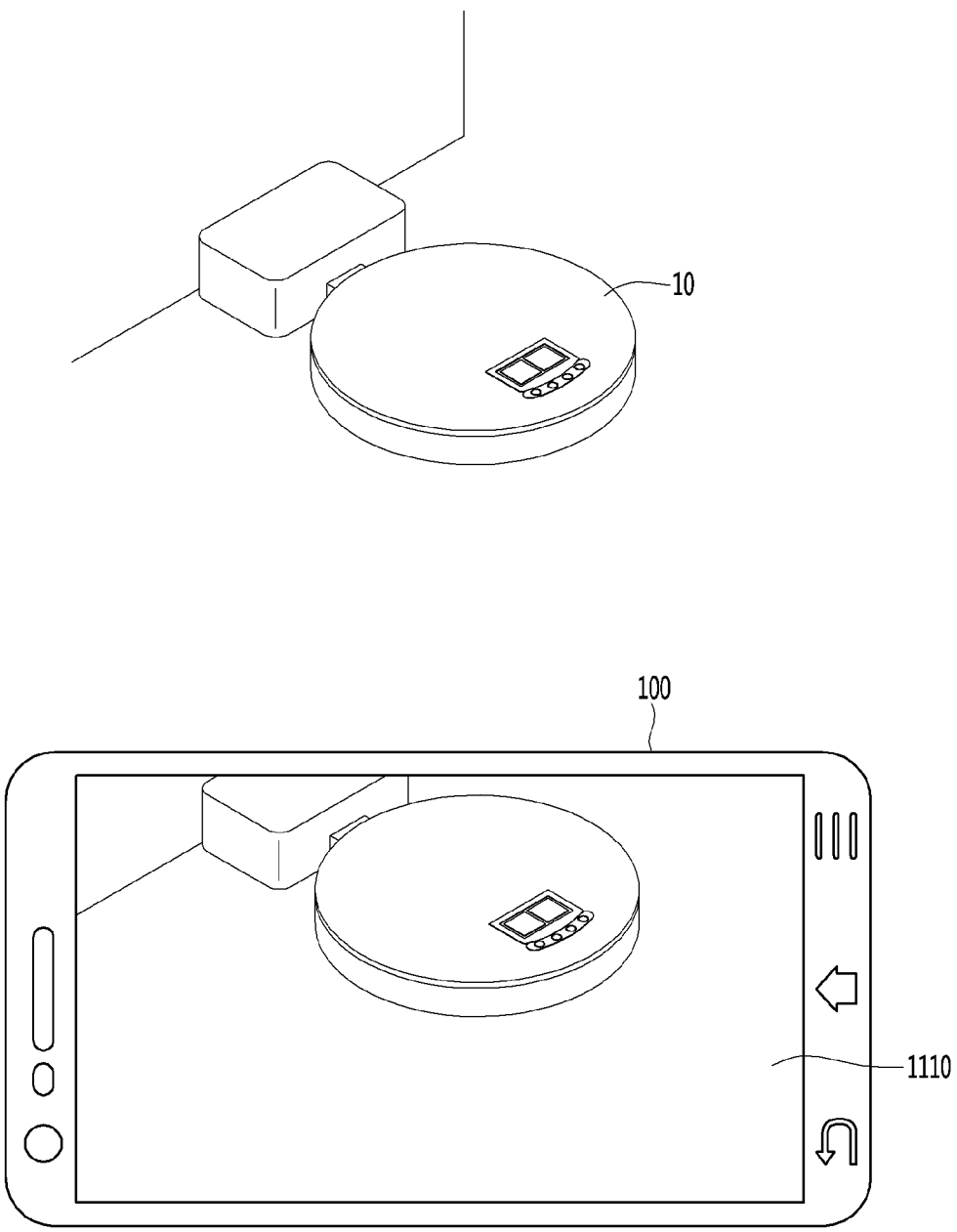
FIGS. 11A and 11B are diagrams illustrating the case where a mobile terminal according to an embodiment of the present invention activates an AR mode.
Figure 11B:
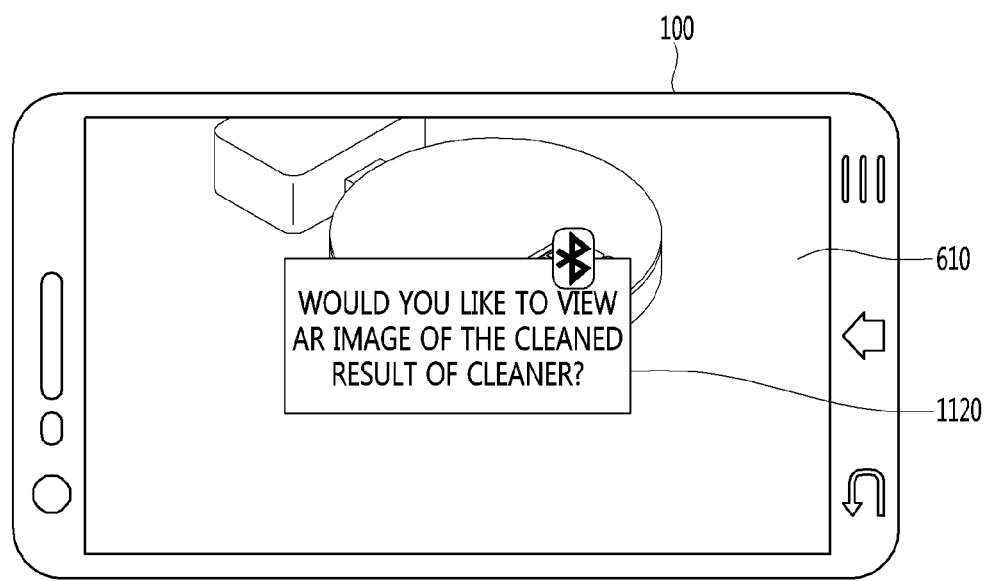

FIGS. 11a and 11b are diagrams illustrating the case where a mobile terminal according to an embodiment of the present invention activates an AR mode.

The mobile terminal according to the embodiment of the present invention may activate the AR mode if the robot cleaner 10 connected to the docking station is included in the screen 1110 captured by the mobile terminal 100. The activated AR mode may be continuously maintained even when the robot cleaner 10 is not displayed on the screen of the mobile terminal 100.

If the AR mode starts, the mobile terminal 100 may display a message for inquiring whether the AR image is displayed on the screen.

Referring to FIG. 11A, the robot cleaner 10 connected to the docking station is included in the screen 1110 captured by the camera 121 provided in the mobile terminal 100. In this case, the robot cleaner 10 pairs with the mobile terminal 100. Accordingly, the mobile terminal 100 recognizes a connectable robot cleaner 10 and starts the AR mode.

Referring to FIG. 11B, a message 1120 displayed on the screen of the mobile terminal 100 when the AR mode is activated is shown. Referring to FIG. 11B, a message 1120 for inquiring whether the cleaned result of the robot cleaner 10 is checked using the AR image is displayed on the screen of the mobile terminal 100.

Figure 12A:
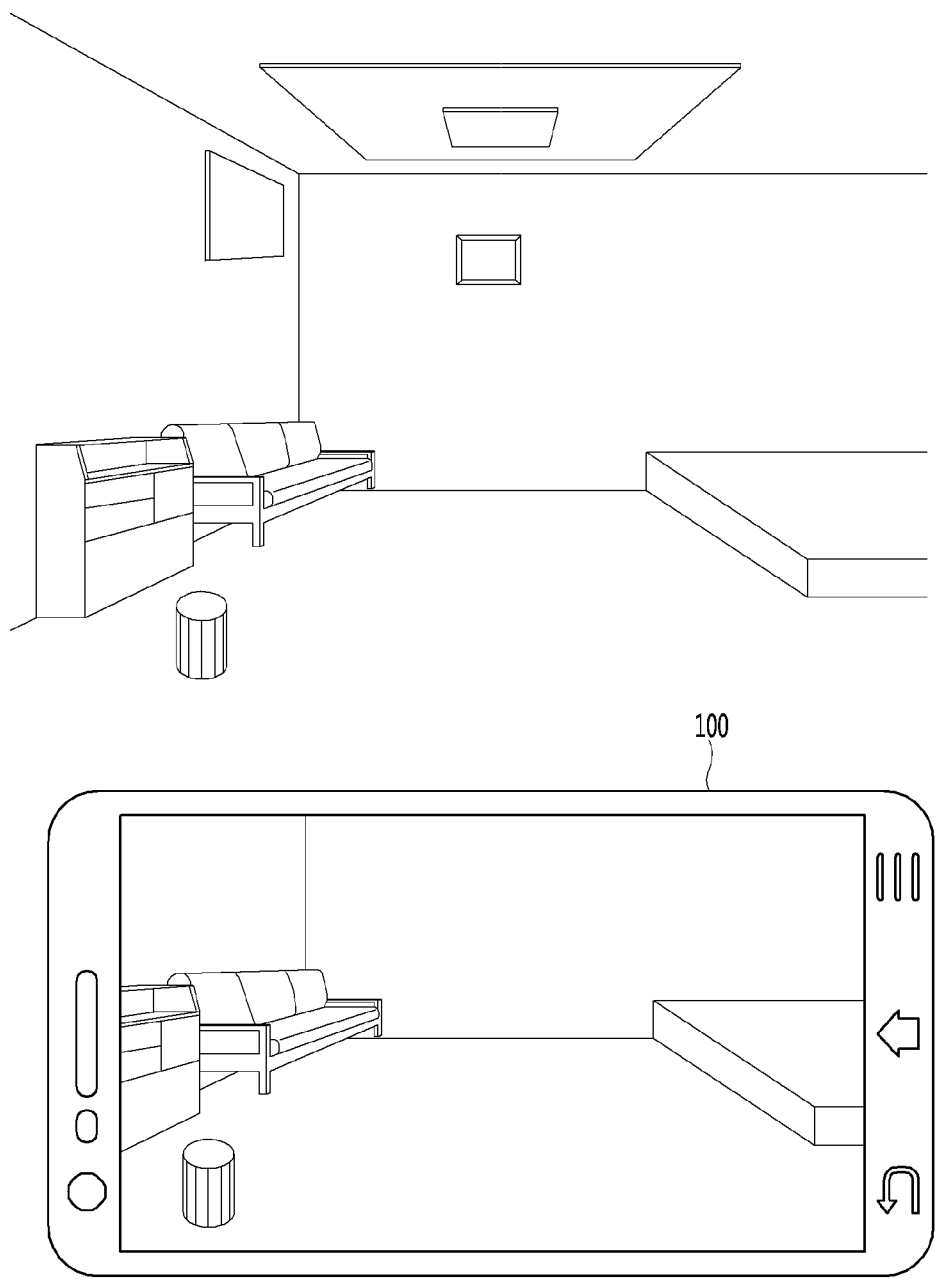
FIGS. 12A to 12C are diagrams illustrating an example in which a mobile terminal according to an embodiment of the present invention displays a cleaned result using an AR image.
Figure 12B:
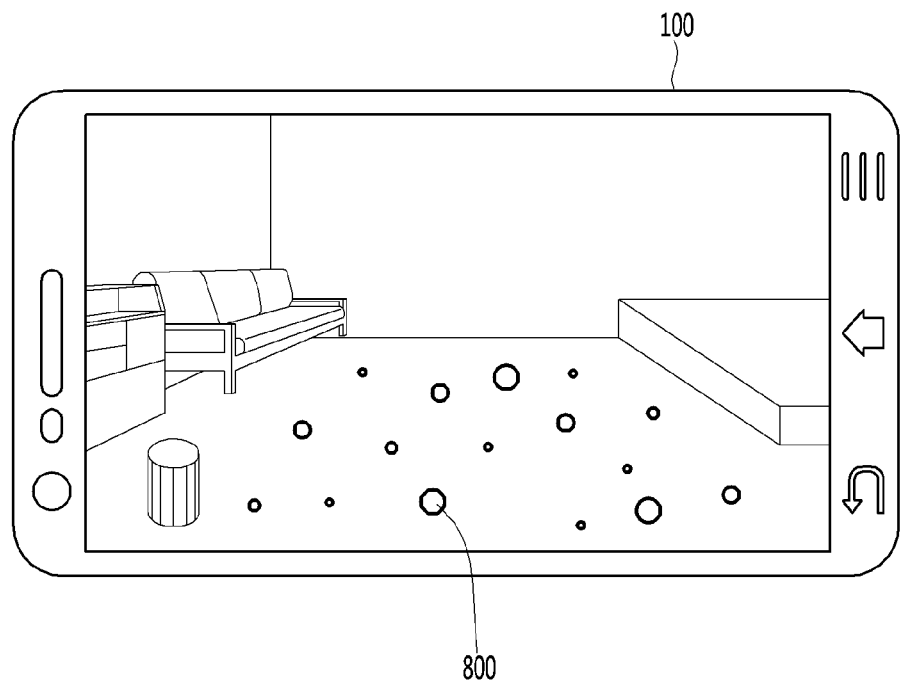
Figure 12C:
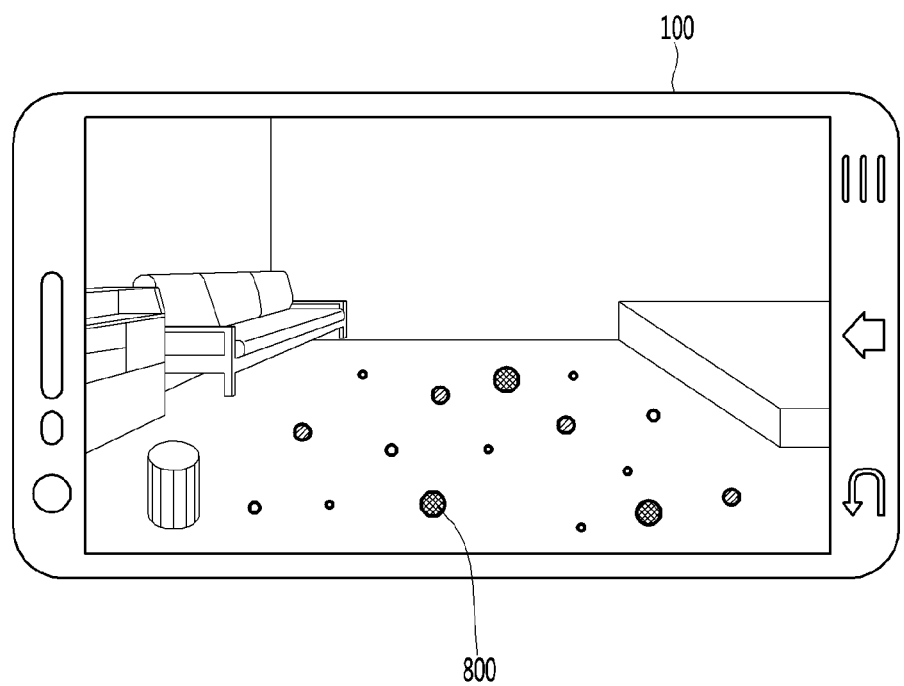

FIGS. 12A to 12C are diagrams illustrating an example in which a mobile terminal according to an embodiment of the present invention displays a cleaned result using an AR image.

The mobile terminal 100 may display the cleaned result using the AR image. Here, the cleaned result may include the amount of sucked dust, the traveling path, the cleaning region, etc.

The mobile terminal 100 may activate the AR mode if the image of the cleaning region is included in the screen captured by the built-in camera. The mobile terminal 100 may generate and display the AR image of the cleaned result on the screen.

According to one embodiment, the cleaned result may include the amount of dust. However, the present invention is not limited thereto and the cleaned result may include various factors indicating the cleaned state.

The mobile terminal 100 may differently display at least one of the size and color of the virtual dust in correspondence with the amount of dust. For example, as the amount of dust detected in the region is increased, the mobile terminal 100 may increase the size of the virtual dust or darken the color of the virtual dust.

Referring to FIG. 12A, the cleaning region is included in the screen of the mobile terminal 100. Therefore, the mobile terminal 100 activates the AR mode.

FIG. 12B shows an example of displaying virtual dust on an image of a cleaning region.

The mobile terminal may display virtual dust on the image of the cleaning region projected onto the screen. In this case, the size of the virtual dust may be changed in correspondence with the amount of dust. Specifically, as the amount of dust sucked in by the robot cleaner 10 is increased, the size of the virtual dust may be increased. In contrast, as the amount of dust sucked in by the robot cleaner 10 is decreased, the size of the virtual dust is decreased. Therefore, the user can easily check the degree of contamination of the cleaning region based on the size of the virtual dust displayed on the real image.

Referring to FIG. 12B, virtual dust particles having the same color are displayed on the image of the cleaning region. In this case, the size of the virtual dust is proportional to the amount of dust. The user may intuitively check the cleaned result of the cleaning region through the virtual dust.

FIG. 12C shows another example of displaying virtual dust on an image of a cleaning region.

The mobile terminal 100 may display the virtual dust on the image of the cleaning region projected onto the screen. In this case, the color and size of the virtual dust may be changed in correspondence with the amount of dust. Specifically, as the amount of dust sucked in by the robot cleaner 10 is increased, the color of the virtual dust may become darker and the size of the virtual dust may be increased. As the amount of dust sucked in by the robot cleaner 10 is decreased, the color of the virtual dust becomes brighter and the size of the virtual dust may be decreased.

Therefore, the user can easily check the degree of contamination and cleaned result of the cleaning region based on the cleaned result of the robot cleaner 10.

Referring to FIG. 12C, virtual dust particles having different colors and sizes are displayed on the image of the cleaning region. In this case, the size of the virtual dust is proportional to the amount of dust. In addition, the color of the virtual dust is proportional to the amount of dust. Therefore, the user may intuitively check the cleaned result of the cleaning region based on the virtual dust.

According to embodiments of the present invention, a user can easily know a degree of contamination of a cleaned region before cleaning based on an AR image of a cleaned result.

According to embodiments of the present invention, a user can accurately check how well cleaning is done by a robot cleaner.

According to embodiments of the present invention, a user can intuitively check a degree of contamination and cleaned result of each cleaning region.

The present invention mentioned in the foregoing description may be implemented as code that can be written to a computer-readable recording medium and can thus be read by a computer system. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the computer-readable medium may be realized in the form of a carrier wave (for example, a transmission over the Internet). The computer may include the controller 180 of the mobile terminal.

The above exemplary embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An augmented reality (AR) system comprising:
   a robot cleaner configured to generate an image of a cleaning region and data for generating an AR image indicating virtual dust for an amount of dust sucked in the cleaning region, when starting cleaning; and
   a mobile terminal configured to request the data corresponding to the cleaning region from the robot cleaner upon capturing a real image of the cleaning region and to display the AR image generated based on the data to be superimposed on the real image upon receiving the data,
   wherein the robot cleaner displays time information which includes at least one of the cleaning start time, the cleaning end time, a time required for cleaning, a residual time, or an estimated time, and
   wherein the mobile terminal activates an AR mode if the robot cleaner is included in a screen captured by a camera in the mobile terminal.

2. The AR system according to claim 1,
   wherein the data includes the amount of dust for the virtual dust and a virtual position in order to generate the AR image, and
   wherein the mobile terminal generates the AR image, in which at least one of a size and color of the virtual dust is changed according to the amount of dust and superimposes the AR image on the real image at a position mapped to the virtual position.

3. The AR system according to claim 1,
   wherein, when a cleaning map for a traveling path from a cleaning start time to a cleaning end time is generated, the robot cleaner further transmits cleaning map data of the cleaning map to the mobile terminal,
   wherein the mobile terminal further superimposes the cleaning map on the real image, on which the AR image is superimposed, upon receiving the cleaning map data.

4. The AR system according to claim 1, wherein the robot cleaner comprises a dust sensor configured to output a sensed signal corresponding to the amount of dust sucked in the cleaning region,
   wherein the dust sensor includes a light emitting diode configured to emit light and a phototransistor configured to output the sensed signal corresponding to an amount of light emitted from the light emitting diode, and
   wherein a value of the sensed signal is changed according to the amount of light changed by the amount of dust introduced into a region between the light emitting diode and the phototransistor.

5. The AR system according to claim 1, wherein, when the amount of dust exceeds a predetermined reference amount, the mobile terminal generates the AR image, in which at least one of a size and color of the virtual dust is changed in correspondence with a difference between the amount of dust and the reference amount.

6. The AR system according to claim 5, wherein the mobile terminal generates the AR image in which the size of the virtual dust is changed to be greater than a reference size corresponding to the reference amount by the difference.

7. The AR system according to claim 5,
   wherein the mobile terminal generates the AR image in which the color of the virtual dust is changed to be darker than a reference color corresponding to the reference amount by the difference.

8. The AR system according to claim 1, wherein, when the amount of dust does not exceed a predetermined reference amount, the mobile terminal generates the AR image in which a size of the virtual dust is changed to be less than a reference size corresponding to the reference amount or a color of the virtual dust is changed to be brighter than a reference color corresponding to the reference amount.

9. A mobile terminal comprising:
   a display;
   a camera;
   a communication interface configured to connect with a cleaning apparatus; and
   a controller configured to:
   activate an AR mode if the cleaning apparatus is included in a screen captured by the camera,
   receive data comprising an amount of dust sucked in a cleaning region from the cleaning apparatus,
   generate an AR image indicating virtual dust based on the received data, and
   display the generated AR image to be superimposed on an image of the cleaning region captured by the camera.

10. The mobile terminal according to claim 9, wherein the data further comprises a position of dust in a real space, and
    wherein the controller is configured to display the AR image in which a position of the virtual dust is determined based on the received data.

11. The mobile terminal according to claim 9, wherein the controller is configured to generate the AR image, in which at least one of a size or color of the virtual dust is changed according to the amount of dust.

12. The mobile terminal according to claim 11, wherein, when the amount of dust exceeds a predetermined reference amount, the controller is configured to generate the AR image, in which the size of the virtual dust is changed to be greater than a reference size by a difference between the amount of dust and the predetermined reference amount.

13. The mobile terminal according to claim 11, wherein, when the amount of dust does not exceed a predetermined reference amount, the controller is configured to generate the AR image, in which the size of the virtual dust is changed to be less than a reference size by a difference between the amount of dust and the predetermined reference amount.

14. The mobile terminal according to claim 9, wherein the controller is configured to receive a cleaning map for a traveling path from a cleaning start time to a cleaning end time from the cleaning apparatus, and display the cleaning map to be superimposed on the image of the cleaning region captured by the camera.

* * * * *